United States Patent [19]
Ware et al.

[11] Patent Number: 5,764,615
[45] Date of Patent: Jun. 9, 1998

[54] DATA STORAGE LIBRARY WITH SINGLE SHAFT

[75] Inventors: Eric A. Ware, Plymouth; Robert J. McPherson, Eden Prairie; Glen D. Kappel, Eagan, all of Minn.; Nigel Street, Cambridge, United Kingdom

[73] Assignee: International Data Engineering, Inc., Eden Prairie, Minn.

[21] Appl. No.: 743,880

[22] Filed: Nov. 6, 1996

[51] Int. Cl.$^6$ ............................................. G11B 17/12
[52] U.S. Cl. ............................. 369/178; 360/92; 369/36; 369/191
[58] Field of Search ............................ 369/36, 178, 191, 369/194; 360/92

[56] References Cited

U.S. PATENT DOCUMENTS

| | | | |
|---|---|---|---|
| 4,839,758 | 6/1989 | Honjoh | 360/99.06 |
| 5,040,159 | 8/1991 | Oliver et al. | 369/34 |
| 5,043,962 | 8/1991 | Wagner et al. | 369/36 |
| 5,060,211 | 10/1991 | Blanding | 369/36 |
| 5,065,379 | 11/1991 | Smith et al. | 369/36 |
| 5,150,341 | 9/1992 | Shibayama | 369/36 |
| 5,345,350 | 9/1994 | Ellis et al. | 360/92 |
| 5,377,121 | 12/1994 | Dimitri et al. | 364/478 |
| 5,431,520 | 7/1995 | Brugger | 369/36 X |
| 5,502,697 | 3/1996 | Taki | 369/34 |

*Primary Examiner*—Stuart S. Levy
*Assistant Examiner*—William J. Klimowicz
*Attorney, Agent, or Firm*—Palmatier, Sjoquist, Helget & Voigt, P.A.

[57] ABSTRACT

A data storage library for storing and accessing data storage media, consisting of a housing, a storage array within the housing, the storage array having a wall, a media storage element arranged adjacent the storage array wall for holding storage media, a data transfer element arranged adjacent the storage array wall for reading and writing information on the storage media, an import/export element to transfer the storage media into and out of the data storage library, and a media transport element which moves along the storage array wall, the media transport element following any deviations in the wall to precisely position itself adjacent the media storage element and data transfer element.

22 Claims, 4 Drawing Sheets

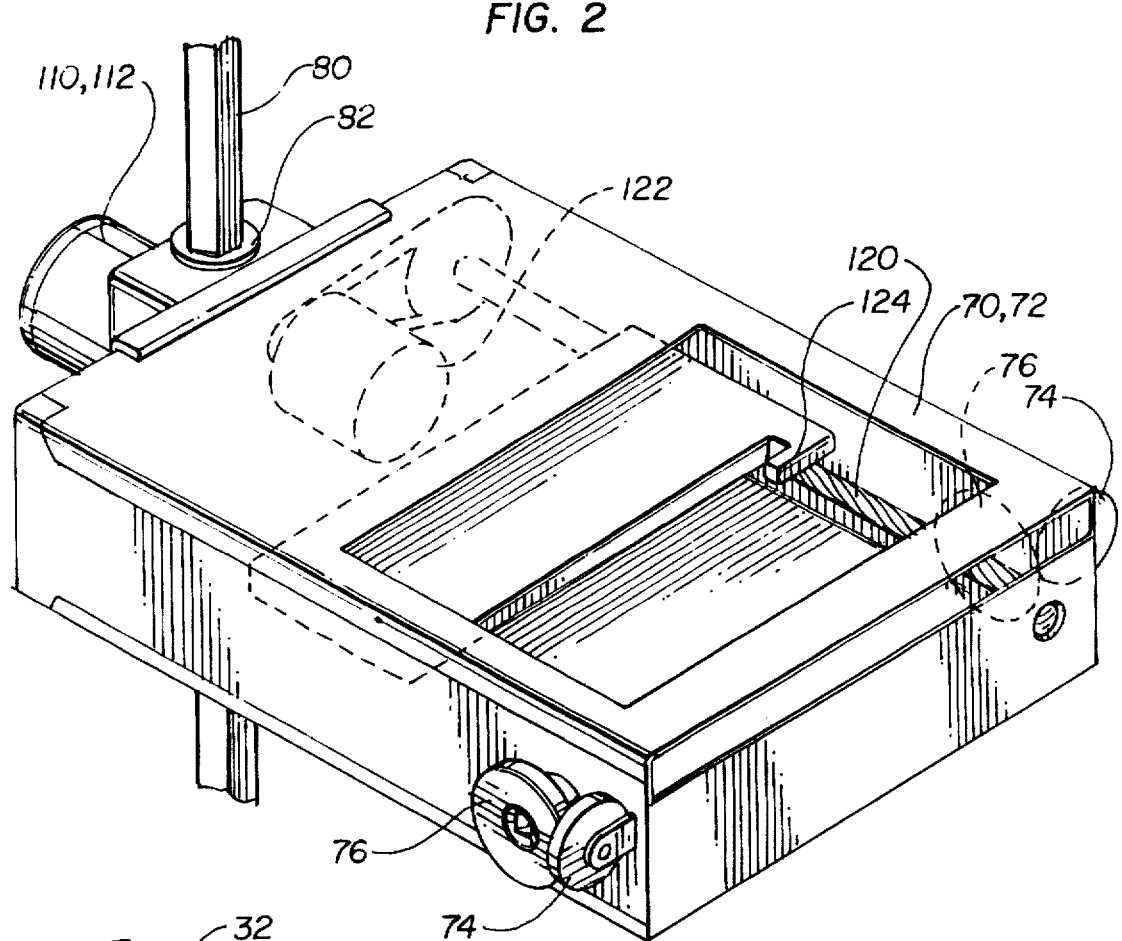
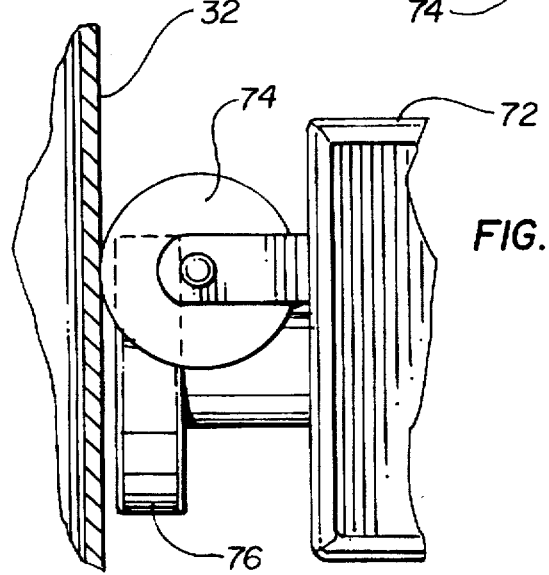
FIG. 2
FIG. 3

DATA STORAGE LIBRARY WITH SINGLE SHAFT

BACKGROUND OF THE INVENTION

The data storage industry has developed various libraries for various media. Since there are many different types of applications, there are many different styles of libraries. Several types of libraries use multiple shafts to guide and drive a picker assembly from drives to media stores. Precision shafts or guide elements can be costly and may require time consuming factory adjustments that could require readjustment in the field. The addition of a gear rack or leadscrew to drive the picker can cause binding if not lined up properly initially and could shift over time.

Commonly, dual shafts allow for the picker and lift assembly to be rotated to service several columns of media stores. However, both shafts must be perfectly parallel to avoid binding the picker assembly during vertical motion. Also, it has been difficult to rotate the two shafts between storage columns to precisely locate the picker for accessing the drives and media stores. If the picker is not precisely located, repeated insertion and withdrawal of media into the drives and media stores can cause excessive wear. Any slight offset in the vertical position of the drives and media stores can cause difficulty in precise picker positioning.

There is a need for a data storage library with a media transport element or picker which can use a single shaft to position the picker between storage columns and raise and lower the picker to access drives and media stores. There is also a need for a data storage library with a simple means of precisely positioning the picker adjacent the drives and media stores regardless of any slight deviations in the position of the drives and media stores from nominal.

SUMMARY OF THE INVENTION

A data storage library for storing and accessing data storage media, consisting of a housing, a storage array within the housing, the storage array having a wall, a media storage element arranged adjacent the storage array wall for holding storage media, a data transfer element arranged adjacent the storage array wall for reading and writing information on the storage media, an import/export element to transfer the storage media into and out of the data storage library, and a media transport element which moves along the storage array wall, the media transport element following any deviations in the wall to precisely position itself adjacent the media storage element and data transfer element.

A principal object and advantage of the present invention is that the media transport element follows the boundary or wall of the storage array to precisely position the media transport element for accessing the media storage element and data transfer element, regardless of any irregularities in the storage array due to thermal expansion, stress relieving, and chassis deflection.

A second principal object and advantage of the present invention is that it uses a single shaft to position the media transport element between storage arrays and to move the media transport element between media storage elements and data transfer elements within a storage array. Having a single shaft, rather than dual shafts, eliminates the need for precise parallel alignment between two shafts.

A feature of the present invention is that the picker has an engagement wheel which rides along the wall of the storage array and a magnet which holds the engagement wheel in contact with the wall.

Another feature of the present invention is that the picker rotates about the single shaft on a picker bushing which has sufficient clearance from the shaft to allow the picker to ride along the storage array wall.

Another feature of the present invention is that the shaft has gear rack teeth machined into one face and there is a lift motor to move the media transport element along the shaft, eliminating the need for a separate pulley system for moving the media transport element.

BRIEF DESCRIPTION OF THE DRAWINGS

FIG. 2 is a detailed perspective view of the media transport element.

FIG. 3 is a detailed view of the engagement wheel and magnet.

DETAILED DESCRIPTION OF THE PREFERRED EMBODIMENTS

Figure 1:
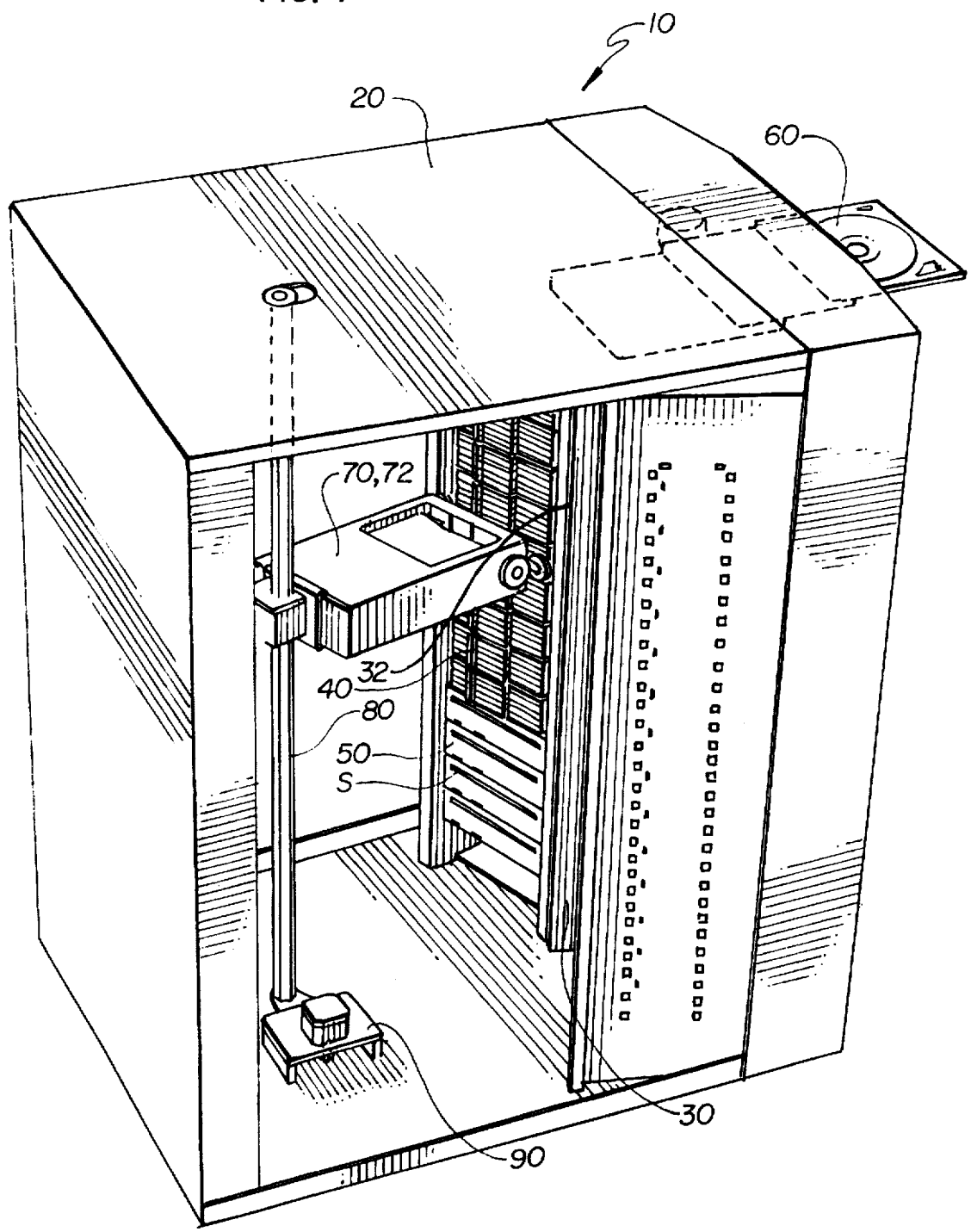
FIG. 1 is a perspective view of the data storage library.
Figure 4:
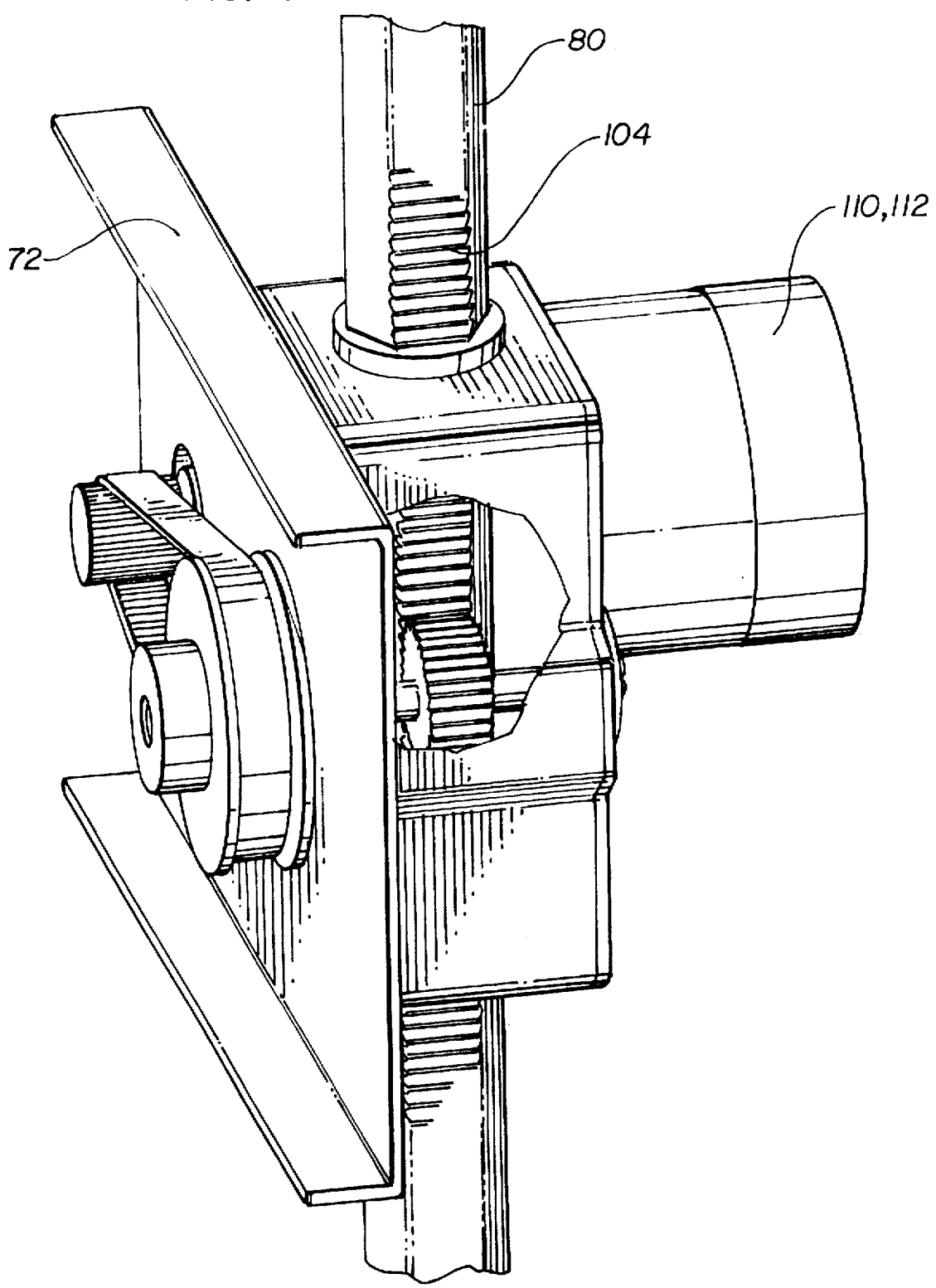
FIG. 4 is a detailed view of the shaft and lift motor.
Figure 5:
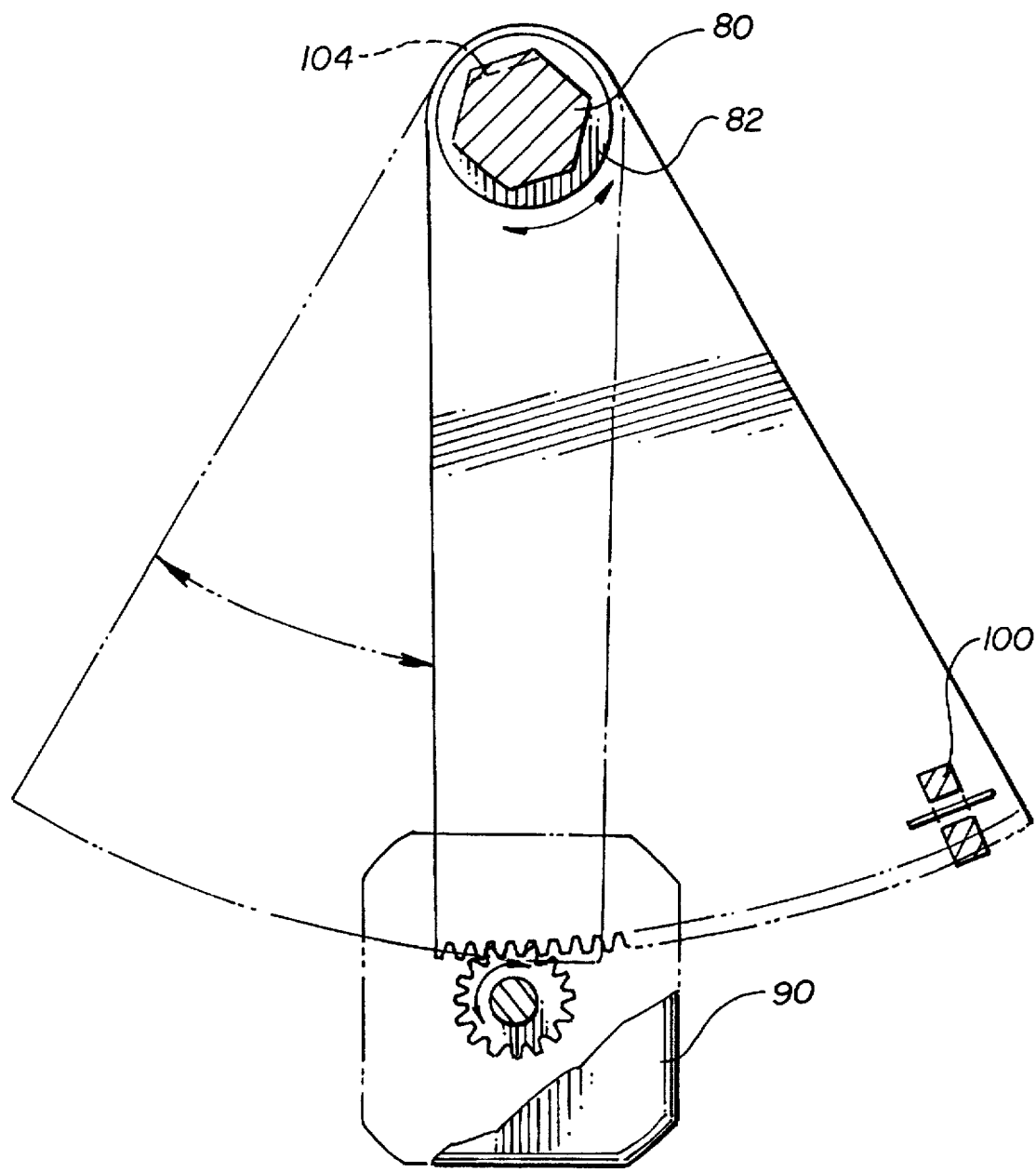
FIG. 5 is a detailed view of the stepper motor and position sensor.

The data storage library of the present invention is generally shown in the Figures as reference numeral 10.

The data storage library 10 consists of a housing 20 which provides a protective environment for the other components of the data storage library 10.

Within the housing 20 is at least one storage array 30 which holds a number of other components. Preferably, more than one storage array 30 is contained within the housing 20. The storage array 30 has a boundary or wall 32. In the preferred embodiment, the storage array 30 is a vertical column, but any other orientation or shape such as horizontal or polygonal is also possible, it being understood that the only requirement for the storage array 30 is to have a boundary or wall 32 along which a media transport element may move as will be further described below.

Arranged within the storage array 30 is at least one and preferably several media storage elements 40. The media storage elements 40 hold the storage media when the storage media are not being read or written to. The storage media can be any media which can be used to record information, such as data and graphics. The recording means may be magnetic, optical, or any other equivalent recording means known in the storage media art. Preferably, the storage media are compact discs (CDs). Preferably, the media storage elements 40 are trays which hold the CDs.

Also arranged within the storage array 30 is at least one and preferably several data transfer elements 50, which are used to read and write information on the storage media. Preferably, the data transfer elements 50 are compact disc drives (CD drives) but the data transfer elements 50 may be any equivalent device such as an optical disc drive, a cassette drive, floppy disc drive or hard drive. The latest CD drives allow the CD to be written to as well as read from, in which case the media is called a PD. Such writable PDs are readily available, an example being the Panasonic LM-RP6500A PD.

An import/export element 60 is used to transfer the storage media into and out of the data storage library 10. The import/export element may be positioned anywhere within the housing 20 as long as its position relative to a storage array 30 is known.

All of the media storage elements 40 and data transfer elements 50 are arranged adjacent the boundary or wall 32 of the storage array, the importance of which will become clear below. Each of the media storage elements 40 and data transfer elements 50 has a slot or other equivalent means S by which the storage media may be inserted and removed. The slot S is at the same distance from the boundary or wall 32 in each of the media storage elements 40 and data transfer elements 50. Preferably, adapters are used to compensate for any difference in the position of the slot S between the media storage elements 40 and data transfer elements 50. Such adapters may preferably attach to the wall 32 of the storage array 30 and position the media storage elements 40 and data transfer elements 50 at the correct distance from the wall 32.

A media transport element 70 is movable within the housing 20 to move the storage media among media storage elements 40, data transfer elements 50, and import/export element 60 within a storage array 30, and also to move between storage arrays 30 when there is more than one storage array.

In order to precisely position the media transport element 70 for accessing the media storage elements 40 and data transfer elements 50, the media transport element 70 follows the boundary or wall 32 of the storage array 30. Because each of the media storage elements 40 and data transfer elements 50 is arranged adjacent the boundary or wall 32 and because each slot S is the same distance from the boundary or wall 32, the media transport element 70 may be precisely positioned so as to insert or remove storage media into or from one of the media storage elements 40 and data transfer elements 50 without any strain being imposed on any component, even if the storage array 30 has any irregularities due to thermal expansion, stress relief, or chassis deflection. That is, even if the media storage elements 40 and data transfer elements 50 are not precisely aligned with each other, the media transport element 70 can compensate easily for any misalignment without any complicated or expensive position sensors.

The need for such precise positioning is great, because friction and strain may produce part failure over the many millions of positionings if the alignment is off by more than 10 thousandths of an inch.

In the preferred embodiment, the media transport element 70 is a robotic picker 72. In the preferred embodiment, the picker 72 moves along a single shaft 80 to position the picker adjacent one of the media storage elements 40 and data transfer elements 50, the motion of the picker 72 along the shaft 80 being constrained by the storage array 30. The single shaft 80 also rotates about its axis as shown in the Figures to move the picker 72 between storage arrays 30. To allow the picker 72 to follow the boundary or wall 32 of the storage array, the picker 72 rotates slightly about the shaft 80.

In the preferred embodiment, the picker 72 has an engagement wheel 74 which rides along the boundary or wall 32 of the storage array 30. An engagement magnet 76 holds the engagement wheel 74 in contact with boundary or wall 32. Preferably, the magnet 76 does not contact the boundary or wall 32, but is held a slight distance away from the boundary or wall 32 by the engagement wheel 74. In this manner, the wheel rolls with very little friction along the wall 32.

In the preferred embodiment, the picker 72 rotates slightly about the shaft 80 on a picker bushing 82. The picker bushing 82 has sufficient clearance from the shaft 80 as to allow the picker to ride along the storage array wall 32 and to move slightly toward and away from the storage array wall 32 as it follows the wall 32. Alternatively, the stepper motor and associated gears may have a slight clearance which allows the picker to ride along the storage array wall 32 and to move slightly toward and away from the storage array wall 32 as it follows the wall 32.

Preferably, the data storage library further comprises a stepper motor 90 which rotates the shaft 80 between storage element arrays 30. A sensor 100 detects that the picker has been positioned adjacent a storage array wall 32. The sensor may preferably be an optical sensor. The stepper motor is then used to precisely position the picker 72 adjacent another storage array wall 32. Preferably, the position of the import/export element 60 relative to the storage arrays 30 is known, and the stepper motor may be used to position the picker 72 adjacent the import/export element 60.

In the preferred embodiment, the shaft 80 has gear rack teeth 104 machined into one face of the shaft 80. A lift motor 110 engages the gear rack teeth 104 to move the picker 72 along the shaft 80. The lift motor 110 has an encoder 112 which is used to determine the position of the picker 72 along the shaft 80.

Preferably, the picker 72 has a slider 120 thereon and a slider motor 122 attached to the slider 120 for moving the slider toward and away from the storage array 30. The slider has a finger 124 which is used to grip the storage medium to insert and remove the storage medium from one of the media storage elements 40 and data transfer elements 50.

In operation, storage media are loaded into the media storage elements 40 either by opening the housing 20 or by using the import/export element 60 to load one medium at a time. If the import/export element 60 is used, the operator signals the data storage library 10 to open the import/export element 60. Storage medium is then placed within the import/export element 60 and the import/export element 60 is closed. The data storage library 10 then signals the picker 72 to retrieve the storage medium from the import/export element 60 and place the storage medium in one of the media storage elements 40.

At initialization, the data storage library 10 rotates the shaft 80 until the sensor 100 detects the presence of the picker 72 against one storage array wall 32. The shaft 80 is then rotated until the sensor 100 detects the presence of the picker 72 against the wall of another storage array 30. The lift motor 110 then raises the picker 72 slightly to signal the zero position vertically. The picker then being at the 0.0 position on the x and y axes of movement, the stepper motor 90 may then be used to position the picker 72 adjacent the wall 32 of any storage array 30. The encoder 112 may be used to position the picker 72 adjacent any of the media storage elements 40 and data transfer elements 50.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A data storage library for storing and accessing storage media, the library comprising:
    (a) a housing having a storage array therein and the storage array having a boundary;
    (b) a media storage element arranged adjacent the storage array boundary and adapted to hold the storage media;
    (c) a data transfer element arranged adjacent the storage array boundary and adapted to read and write information on the storage media;
    (d) an import/export element adapted to transfer the storage media into and out of the data storage library; and (e) a media transport element adapted to move the storage media among the import/export element, storage element, and data transfer element
wherein the media transport element moves along only a single shaft and follows the storage array boundary as it moves between the media storage element and data transfer element, the media transport element rotating slightly about the shaft to allow the media transport element to follow the storage array boundary, whereby the media transport element is precisely positioned for accessing the media storage element and data transfer element, the single shaft having a plurality of gear rack teeth machined therein and the data storage library further comprising a lift motor engaging the gear rack teeth to move the transport element along the shaft and an encoder to determine the position of the media transport element along the shaft.

2. The data storage library of claim 1, wherein the storage array is a substantially vertical column.

3. A data storage library for storing and accessing storage media, the library comprising:
(a) a housing having a plurality of storage arrays therein;
(b) a plurality of media storage elements arranged within the storage arrays and adapted to hold the storage media;
(c) a plurality of data transfer elements arranged within the storage arrays and adapted to read and write information on the storage media;
(d) an import/export element positioned in a storage array and adapted to transfer the storage media into and out of the data storage library; and
(e) a media transport element adapted to move the storage media among the import/export element, media storage elements, and data transfer elements
wherein the media transport element further comprises a robotic picker moving along only a single shaft to position the picker adjacent one of the media storage elements, data transfer elements, and import/export element, the motion of the picker along the shaft being constrained by the storage array, and the single shaft rotating about its axis to move the picker between storage arrays and the picker rotating slightly to allow the motion of the picker along the shaft to follow the boundaries of the storage array
whereby the picker is precisely positioned adjacent one of the media storage elements and data transfer elements despite any irregularities in the storage array due to thermal expansion, stress relieving, and chassis deflection.

4. The data storage library of claim 3, wherein each of the storage arrays has a wall and the picker rides along the wall.

5. The data storage library of claim 4, wherein the picker further comprises an engagement wheel which rides along the wall and an engagement magnet which holds the engagement wheel in contact with the wall.

6. The data storage library of claim 4, wherein the picker rotates about the shaft on a picker bushing, the bushing having sufficient clearance from the shaft to allow the picker to ride along the storage array wall.

7. The data storage library of claim 4, further comprising a stepper motor which rotates the shaft between storage arrays.

8. The data storage library of claim 7, further comprising a sensor which locates the picker adjacent a storage array wall.

9. The data storage library of claim 8, wherein the sensor is optical.

10. The data storage library of claim 3, wherein the shaft further comprises gear rack teeth machined into one face of the shaft and the data storage library further comprises a lift motor engaging the gear rack teeth to move the picker along the shaft and an encoder to determine the position of the picker along the shaft.

11. The data storage library of claim 3, wherein the storage arrays are substantially vertical columns within the housing.

12. The data storage library of claim 3, wherein the storage medium is a CD and the data transfer element is a CD drive.

13. The data storage library of claim 3, further comprising a slider and slider motor attached to the slider and a finger attached to the slider, the slider motor positioning the finger so as to grip the storage medium.

14. A data storage library for storing and accessing storage media, the library comprising:
(a) a housing having a plurality of storage arrays therein, each storage array having a wall;
(b) a plurality of media storage elements arranged within the storage arrays and adapted to hold the storage media;
(c) a plurality of data transfer elements arranged within the storage arrays and adapted to read and write information on the storage media;
(d) an import/export element adapted to transfer the storage media into and out of the data storage library;
(e) a robotic picker moving along only a single shaft to position the picker adjacent one of the media storage elements and data transfer elements, the picker moving along the wall of a storage array, and the single shaft rotating about its axis to move the picker between storage arrays and the picker rotating slightly about the shaft to allow the motion of the picker along the shaft to follow the wall of the storage array; and
(f) the single shaft having a plurality of gear rack teeth machined therein and the data storage library further comprising a lift motor engaging the gear rack teeth to move the picker along the shaft and an encoder to determine the position of the picker along the shaft
whereby the picker is precisely positioned adjacent one of the media storage elements and data transfer elements despite any irregularities in the storage array due to thermal expansion, stress relieving, and chassis deflection.

15. The data storage library of claim 14, wherein the picker further comprises an engagement wheel which rides along the wall and an engagement magnet which holds the engagement wheel in contact with the wall.

16. The data storage library of claim 14, wherein the picker rotates about the shaft on a picker bushing, the bushing having sufficient clearance from the shaft to allow the picker to ride along the storage array wall.

17. The data storage library of claim 14, further comprising a stepper motor which rotates the shaft to move the picker between storage arrays.

18. The data storage library of claim 17, further comprising a sensor which locates the picker adjacent a storage array wall.

19. The data storage library of claim 18, wherein the sensor is optical.

20. The data storage library of claim 14, wherein the storage arrays are substantially vertical columns within the housing.

21. The data storage library of claim 14, wherein the storage medium is a CD and the data transfer element is a CD drive.

22. The data storage library of claim 14, further comprising a slider and slider motor attached to the slider and a finger attached to the slider, the slider motor positioning the finger so as to grip the storage medium.

* * * * *